Nov. 19, 1963   R. C. IREY   3,111,236
BOAT TRAILER
Filed June 10, 1960   4 Sheets-Sheet 1
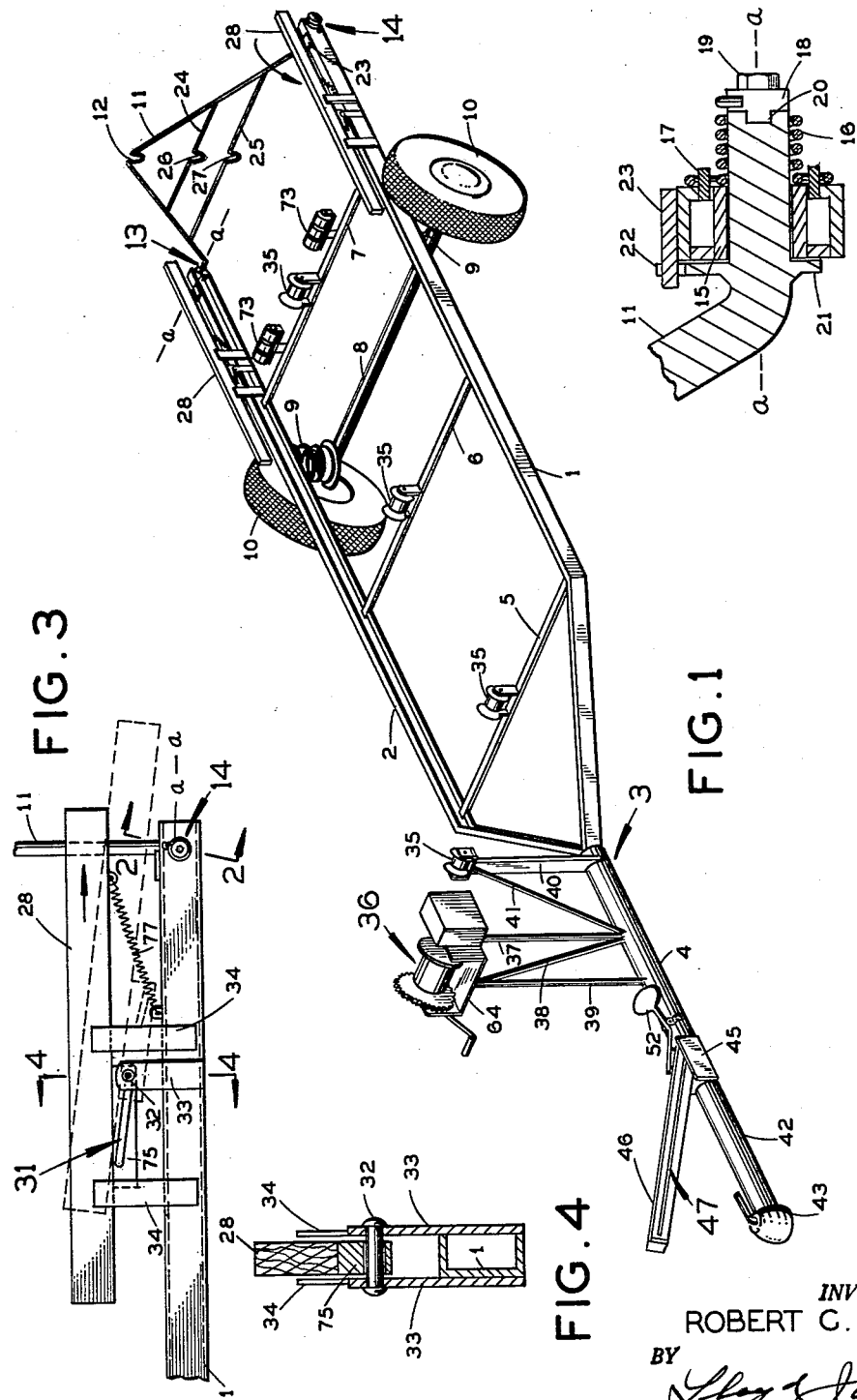
INVENTOR.
ROBERT C. IREY
BY

Nov. 19, 1963  R. C. IREY  3,111,236
BOAT TRAILER
Filed June 10, 1960  4 Sheets-Sheet 2

INVENTOR.
ROBERT C. IREY
BY

Nov. 19, 1963  R. C. IREY  3,111,236
BOAT TRAILER
Filed June 10, 1960  4 Sheets-Sheet 3

INVENTOR.
ROBERT C. IREY
BY

Nov. 19, 1963 R. C. IREY 3,111,236
BOAT TRAILER
Filed June 10, 1960 4 Sheets-Sheet 4

*INVENTOR.*
ROBERT C. IREY
BY
*Lloyd J. Andres*

United States Patent Office 3,111,236
Patented Nov. 19, 1963

3,111,236
BOAT TRAILER
Robert C. Irey, 11450 SW. 60th Ave., Miami, Fla.
Filed June 10, 1960, Ser. No. 35,328
4 Claims. (Cl. 214—506)

This invention relates in general to vehicle trailers and more particularly to a boat trailer for safely securing a boat thereto and for convenient launching and retrieving of a boat to and from the water at a beach or ramp.

Boat trailers previous to this invention required considerable maneuvering on the part of the vehicle and excessive manual effort in aligning and directing the boat during semi-floatation during launching and retrieving, which often resulted in the vehicle being mired in the beach and damage to the hull of the boat.

The present invention overcomes the above objections and disadvantages by employing a trailer having a keel alignment construction in addition to a spring energized winch whereby a boat may be launched or retrieved substantially automatically with a minimum of manual effort, which are principal objects of the invention.

Another object of the invention is the provision of an energized elevator means for supporting the lowering of the hull of a boat with reference to the frame of a trailer.

A further object of the invention is the provision of a telescopic drawbar for the trailer which provides for the elongation and descent of the trailer with respect to the hitch on the trailer for lowering the frame of the trailer without moving the vehicle into hazardous position on the beach or ramp.

These and other objects and advantages of the invention are described and shown in the following drawings and specification in which:

FIG. 1 is a perspective view of the trailer in reduced scale.

FIG. 2 is an enlarged fragmentary cross sectional view of a keel guide element shown FIG. 1.

FIG. 3 is a fragmentary elevation of the hull support mechanism shown FIG. 1.

FIG. 4 is a cross sectional view taken through section line 4—4, FIG. 3.

Figure 5:
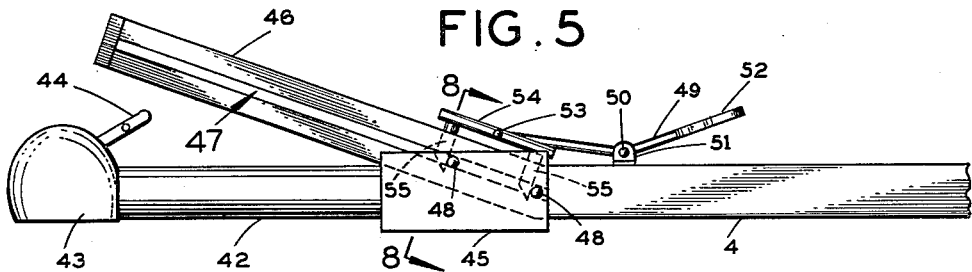
FIG. 5 is a side elevation of the drawbar shown FIG. 1 in normal position.
Figure 6:
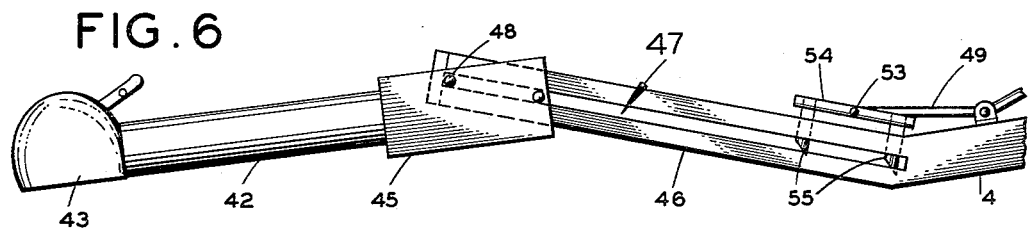

FIG. 6 same as FIG. 5 in released position.

Figure 7:
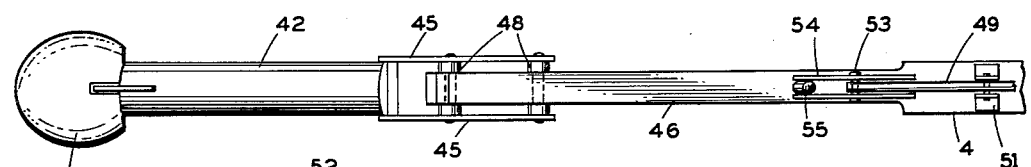

FIG. 7 is a plan view of the draw bar shown FIG. 6.

Figure 8:
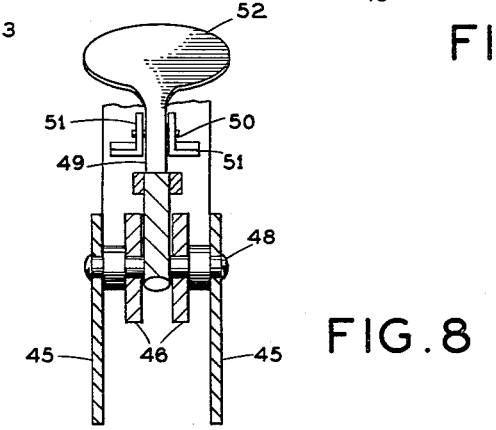

FIG. 8 is a cross sectional view taken through section line 8—8, FIG. 5.

Figure 9:
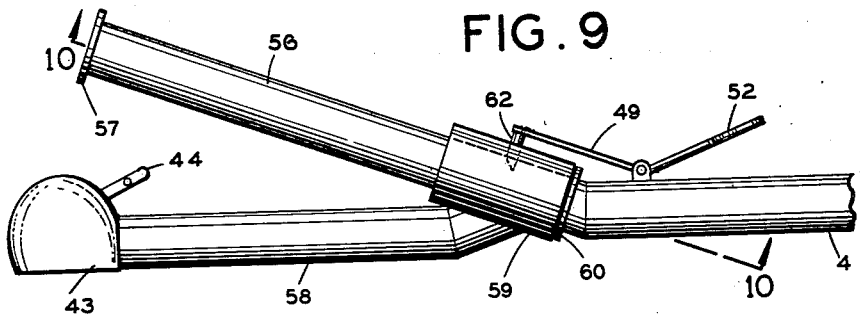

FIG. 9 is a side elevation of an alternate form of draw bar.

Figure 10:
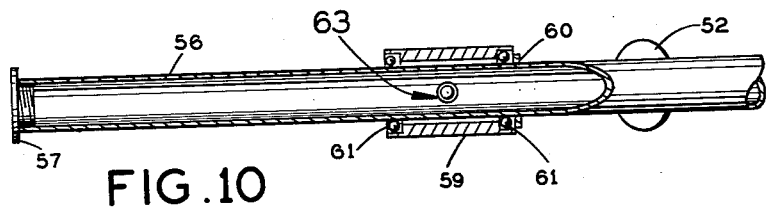

FIG. 10 is a cross sectional view taken through section line 10—10, FIG. 9.

Figures 11, 12:
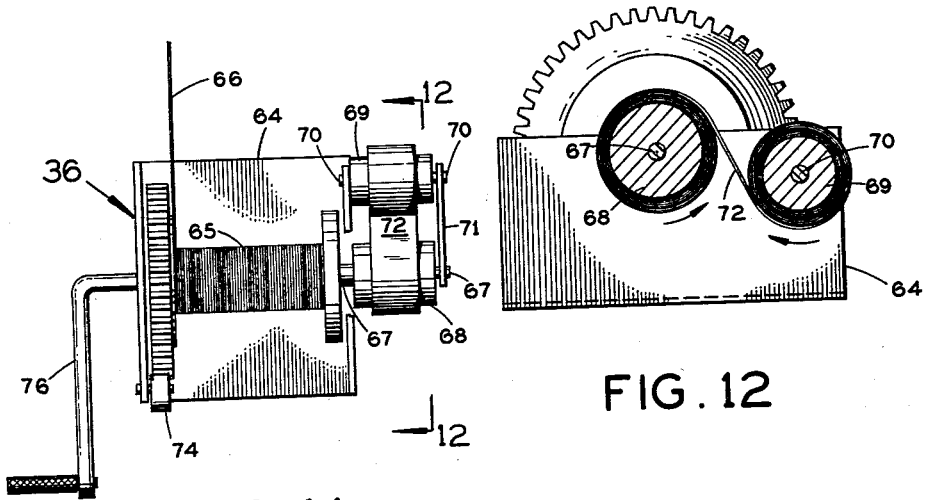

FIG. 11 is a top plan view of the winch shown FIG. 1.

FIG. 12 is a cross sectional elevation taken through section line 12—12, FIG. 11.

Figure 13:
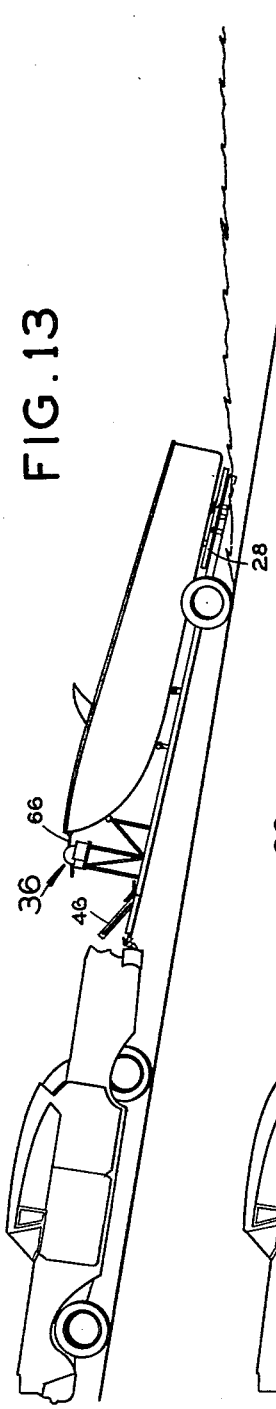

FIG. 13 illustrates the position of a vehicle and trailer in launching position.

Figure 14:
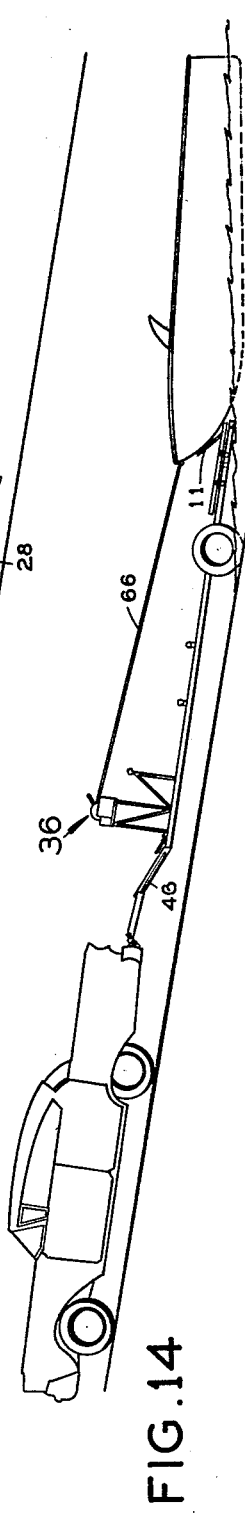
Figure 15:
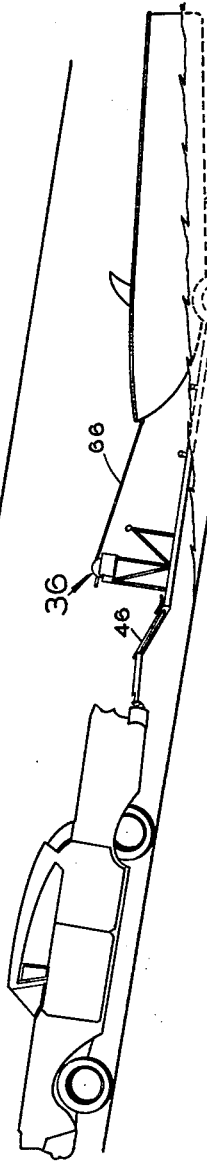
Figure 16:
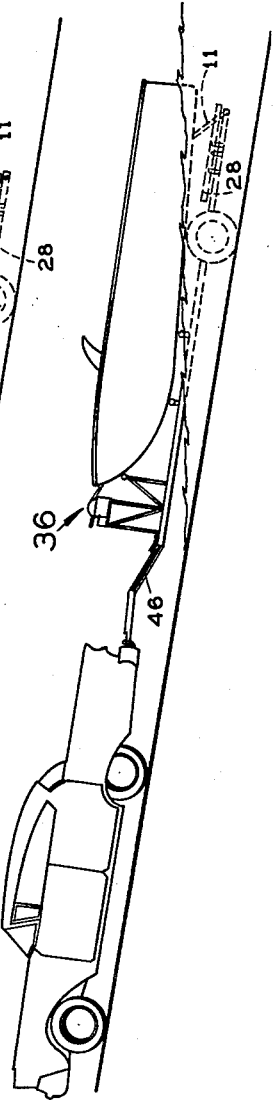

FIGS. 14, 15 and 16 illustrate the three positions of the vehicle and trailer during retrieving operations.

Referring to FIG. 1, the frame in this particular embodiment is made of two steel channels 1 and 2 formed at a junction 3 and rigidly secured to draw bar 4 as shown. The frame also includes lateral brace members 5, 6 and 7 secured at opposite ends thereof to channels 1 and 2. An axle 8 is secured by conventional coil springs 9—9 to opposite channels as shown. A pair of pneumatic tired wheels 10—10 are journalled on opposite ends of axle 8 in conventional manner.

A keel guide 11 centrally terminating in an inverted U shaped recess 12 is journalled for oscillation at opposite ends at locations 13 and 14 in channels 1 and 2.

FIG. 2 illustrates the construction of the keel guide 11 at location 14 which is shaped to rotate about a horizontal axis a—a in a bearing 15 secured in channel 1. A torsion spring 16 having one end secured to the channel 1 by stop 17 and the outer end thereof secured in a retainer 18 keyed to member 11 by screw 19 and tongue 20.

A collar 21 secured to guide 11 provides a lateral bearing for the latter and a projection 22 thereon serves as a stop when moved against a stop plate 23 secured on channel 1, when the guide member is moved upright from a forward position as shown in FIGS. 1 and 2.

The opposite end of guide 11 is journalled for rotation at location 13 about the same axis a—a in channel 2 in the same manner as shown in FIG. 4 except without the spring means.

Cross members 24 and 25 are welded transverse to guide 11 and include inverted U shaped recesses 26 and 27. Each of the recesses 12, 26 and 27 are inclined at a forward angle with respect to the plane of guide 11 for reasons to be hereinafter described. This construction also embraces a reversal of the spring means shown FIG. 2 and the opposite position of the U shaped recesses 12, 26 and 27 whereby the guide member 11 is tilted rearward by the action of the spring instead of forward with respect to the trailer.

Referring to FIG. 1, independent hull supports on each channel 1 and 2 comprise a pair of support members 28 pivotally secured to the channels 1 and 2 respectively.

Referring to FIGS. 3 and 4, each hull support member 28 has a block 75 secured to the lower edge thereof having an obliquely positioned slot 31 therein as shown. A stud 32 engaged in slot 31 is secured by parallel clevis plates 33—33 anchored to opposite sides of channel 1. Two pair of parallel guide plates 34—34 are secured in spaced relation to channels 1 and 2 forming a U shaped lateral guide for positioning and guiding supports 28 therebetween. A spring 77 is secured at opposite ends between each channel and each of the supports 28 for normally and independently urging the latter into normal position as shown in full lines in FIGS. 1 and 3 for supporting the hull of the boat thereon.

Referring to FIG. 1, three flanged rollers 35—35—35 are secured for rotation by suitable clevis means secured to brace members 5, 6 and 7 for guiding and retaining the keel of the boat. A winch assembly 36 to be hereinafter described is mounted in fixed position on draw bar 4 by means of supports 37, 38 and 39. Another guide roller 35 is journalled for rotation on a clevis 40 secured to drawbar 4 and braced by support 41 for retaining the bow of a boat.

Referring to FIG. 5, a drawbar extension member 42 terminates at its outer end in a conventional ball socket hitch 43 which is normally locked to a mating ball member on the vehicle, not shown, which provides for limited universal angular motion of the draw bar of the trailer with respect to the vehicle. The opposite end of member 42 terminates in a clevis member 45 engaged with the draw bar 46.

The end portion 46 of the drawbar 4 is formed in an upturned portion as shown having a longitudinal slot 47 therein. A pair of spaced studs 48—48 are loosely fitted through slot 47 and secured in clevis 45 in the opposite sides thereof as shown. A foot lever 49 is pivoted on a stud 50 secured on drawbar 4 by a clevis 51. The right hand portion of the lever terminates in a foot pedal 52 and the left hand portion of the lever is pivoted by stud 53 to a pawl member 54, better shown FIG. 8. The pawl member 54 includes a pair of spaced parallel latches 55.

In FIG. 5, the drawbar is shown latched in its forward position for the transport of the trailer. FIGS. 6 and 7 show the relative positions of the draw bar 4 with respect to the draw bar member 42 when the pedal 52 is depressed and the trailer has moved to its extended and downward tilted position, as illustrated in FIGS. 13 and 14.

FIGS. 9 and 10 illustrate an alternate construction of the drawbar in which the upturned portion 56 thereof is a cylindrical extension 58 of the drawbar 4 terminating at its end in stop flange 57. A fixed oblique cylinder 59 is secured to the opposite end of the extension 58 in which the portion 56 of the drawbar is adapted to reciprocate between flange 57 and a stop flange 60 secured to the drawbar.

FIG. 10 illustrates the use of a pair of annular ball bearings 61 between the portion 56 and the cylinder 59 thus providing for an anti-friction and rotary compensation of the drawbar during the extension or retraction of the trailer. The foot lever 49 terminates in a single pin 62 adapted to engage a recess 63 in portion 56.

Referring to FIGS. 11 and 12, the winch assembly 36 comprises a frame 64 supporting therein a conventional gear driven drum 65 for winding thereon a traction cable 66 and a holding click 74.

An outer extension 67 of the drum shaft has a coaxial pulley 68 secured thereto. An idler pulley 69 is journalled on a shaft 70 secured in the frame 64. Support member 71 anchored to the frame serves as an outboard bearing for both the shafts 67 and 70.

Referring to FIG. 12, a flat torsion spring 72 is wound around pulleys 68 and 69 in opposite directions as shown and tensioned to normally urge the drum 65 for rotation in a direction for winding the cable 66 on the drum as required for retrieving the boat. Because of the required relatively large number of rotations of the drum, a constant tension spring commonly known as a "Hunter" spring is preferred, although one or more spiral springs may be used to motivate the drum at some sacrifice of uniform tension exerted on the cable.

Referring to FIG. 1, a pair of multiple roller guides 73 are mounted on adjustable swivels (not shown) and secured to cross member 7 for guiding, supporting and preventing lateral tilting of the boat.

In operation and when the boat is transported on the trailer, the keel is supported by the rollers 35 on cross members 5, 6 and 7 and the bow is retained in roller 35 on clevis support 40 and the hull is supported by self-adjusting roller guides 73—73 and the support members 28, as shown in full lines in FIG. 3. The keel guide 11 is rotated to a forward tilted position with the recesses 12, 26 and 27 therein straddling the keel of the boat. The cable on the winch is retrieved by virtue of spring 72 and locked by click 74 as shown FIG. 11.

It is to be noted that during transport the forward and upward tilting action of the supports 28 will automatically accommodate the shape of the hull and will support same in an uppermost position as shown by virtue of the support of studs 32 engaged in inclined slots 31 in each block 75 under the influence of each spring 77 and the guidance of plates 34.

FIG. 13 illustrates a vehicle with the trailer supporting a boat ready for launching with the portion 46 of the drawbar 4 in retracted position providing a relatively steep launching angle and secured to the trailer by the cable 66 fully wound on the winch. In this position the click 74 of the winch is released and the boat will gravitate rearward into the water and float from the trailer and simultaneously energize spring 72 by virtue of the unwinding of the cable 66 from drum 65. It is to be noted that the supports 28 in frictional contact with the hull of the boat will move rearward and downward against the restraining action of springs 77 as illustrated by dotted lines FIG. 3, thus releasing their normal support to the hull and permitting the boat to float free therefrom.

The boat is retrieved from flotation in the water by first securing the end of the now extended cable 66 to the bow of the boat as illustrated in FIG. 14 and the foot pedal 52 depressed permitting the trailer to gravitate rearward and downward with respect to the vehicle, as illustrated.

The vehicle is then moved rearwardly a predetermined distance to submerge the rear portion of the trailer under the surface of the water as illustrated in FIG. 15 and the click 74 of the winch 36 released permitting the cable to wind on drum 65 by virtue of the energy previously stored in spring 72 which will retrieve the boat as shown in FIG. 16.

It is to be noted that during the retrieving operation the keel will be engaged and aligned by recesses 12, 26 and 27 as guide 11 is tilted forward which will rotate from substantially vertical position to a forward tilted position under the restraining action of the spring 16. Thus the boat will be centrally aligned with respect to the trailer. It is also to be noted that the supports 28 are retained by springs 77 in their normal elevated position shown in full lines FIG. 3, for guiding and supporting both sides of the hull as the boat is retrieved. When the boat is fully retrieved over the trailer by the automatic action of the winch 36 and the bow is retained by the forward rollers 35 and the keel guide 11, the trailer is moved forward and upward by the vehicle and the boat will be lifted from flotation and rest upon the now elevated supports 28 on opposite sides of the hull and the pair of auxiliary roller guides 73.

When the vehicle and trailer are moved to level terrain, the vehicle is de-accelerated, or reversed sufficiently to retract the forward portion 46 of the draw bar as shown FIG. 13 and thus raise the trailer to normal transport position.

It is to be noted that the keel guide 11 under the influence of torsion spring 16 will maintain the recesses therein in straddle relation on the keel as an added security for retaining the boat centered on the trailer and for guiding the boat during subsequent launching.

The crank 76 shown FIG. 11 is used only for minor adjustments of the cable or for pre-loading the spring 72 as may be required and for manual assist during retrieving operations under adverse circumstances.

It is understood that certain modifications of the above construction utilizing the above described features are intended to come within the scope of the appended claims.

Having described my invention I claim:

1. A mobile vehicular trailer for a boat comprising means forming a substantially planar frame, draw bar means secured to and centrally extending coplanar from one end of said frame having an outer end portion thereof upwardly inclined at a predetermined angle, a draw bar means extension member having the outer end thereof terminating in a socket adapted for universal pivotal engagement to a vehicle, the inner end of said extension member slidably retained on said end portion for predetermined reciprocating movement thereon from a retracted transport position to an extended position for tilting said frame with the front end thereof lowered with respect to said vehicle, releasable lock means on said draw bar means for engaging and holding said extension member in said retracted position and for releasing same for movement to said extended position by the action of gravity on said trailer when operated, a keel guide pivoted at opposite rear sides of said frame having an open upstanding recess therein centrally positioned with respect to said frame for engaging and centrally guiding the keel of said boat onto said frame, spring means biased between said frame and said guide for normally urging the latter in upright position for urging said guide into engagement with said keel when the latter is centrally positioned above said frame and moved in a downward vertical direction with respect to said frame, a pair of linear hull support members independently pivoted at opposite sides of said frame substantially longitudinal therewith adapted and constructed for vertical and linear movement with respect to said frame from an upper to a lower and rearwardly tilted position, spring means biased between said frame and each of said support members for independently urging the latter into said upper position for guiding and supporting opposite sides of the hull of said boat when the latter is moved onto and off of said frame, a plurality of roller means centrally positioned in spaced relation along said frame for centrally engaging and retaining the keel of said boat on said frame when said boat is moved or resting thereon, winch means on said draw bar means including cable means adapted to be secured to the bow of said boat for releasing and retrieving said boat to and from said trailer and locking said boat thereon for transport when operated, spring means operatively associated with said winch means constructed and adapted to be energized when said boat is released to gravitate from said trailer when the latter is moved into a rearward sloping position and adapted to energize said winch and biased to at least partially retrieve said boat onto said trailer when the latter is lowered a predetermined distance by said vehicle and when said boat is floated into longitudinal register therewith and said trailer is gravitated into said tilted position by release of said lock means and said winch is operated.

2. In a mobile boat trailer of the character described a means forming a frame, draw bar means secured to and centrally extending from one end of said frame, said bar means having an inner portion substantially coplanar with the frame and an outer end portion inclined upwardly at a predetermined angle, a draw bar extension member having the outer end thereof terminating in a socket adapted for universal pivotal engagement to a vehicle, the inner end of said extension member slidably retained on said end portion for predetermined reciprocating movement thereon with said end portion from a retracted transport position to an extended position for tilting said frame with the front end thereof lowered with respect to said vehicle, releasable lock means on said draw bar means for engaging and holding said extension member in said retracted position and for releasing same for movement to said extended position by the action of gravity on said trailer when operated.

3. The construction recited in claim 2 including a keel guide pivoted at opposite rear sides of said frame having an open upstanding recess therein centrally positioned with respect to said frame for engaging and centrally guiding the keel of said boat onto said frame, spring means biased between said frame and said guide for normally urging the latter in upright position for urging said guide into engagement with said keel when the latter is centrally positioned above said frame and said frame is moved in a vertical direction to engage said boat in a rest position on said frame.

4. In a mobile vehicular trailer for a boat a means forming a frame, draw bar means secured to and centrally extending from one end of said frame having an outer end portion thereof upwardly inclined at a predetermined angle, a draw bar extension member having the outer end thereof terminating in a socket adapted for universal pivotal engagement to a vehicle, the inner end of said extension member slidably retained on said end portion for predetermined reciprocating movement thereon from a retracted transport position to an extended position for tilting said frame with the front end thereof lowered with respect to said vehicle, releasable lock means on said draw bar means for engaging and holding said extension member in said retracted position and for releasing same for movement to said extended position by the action of gravity on said trailer when operated, winch means on said draw bar means including cable means adapted to be secured to the bow of said boat for releasing and retrieving said boat to and from said trailer and locking said boat thereon for transport when operated, spring means operatively associated with said winch means constructed and adapted to be energized when said boat is released to gravitate from said trailer when the latter is moved into a rearward sloping position and adapted to energize said winch and retrieve said boat onto said trailer when the latter is lowered a predetermined distance by said vehicle and when said boat is floated into longitudinal register therewith and said trailer is gravitated into said tilted position by the release of said lock means and said winch is operated.

References Cited in the file of this patent
UNITED STATES PATENTS

| | | |
|---|---|---|
| 2,673,694 | Howell | May 30, 1954 |
| 2,691,534 | Sampsell | Oct. 12, 1954 |
| 2,696,695 | Decker | Dec. 14, 1954 |
| 2,705,081 | Jacobs | Mar. 29, 1955 |
| 2,765,942 | Niemeier | Oct. 9, 1956 |
| 2,789,713 | Agricola | Apr. 23, 1957 |
| 2,789,835 | Ashton | Apr. 23, 1957 |
| 2,838,192 | Dzvonik | June 10, 1958 |
| 2,895,629 | Truxall | July 21, 1959 |
| 2,925,927 | Smith | Feb. 23, 1960 |
| 2,980,270 | Elliott et al. | Apr. 18, 1961 |